United States Patent Office 2,853,339
Patented Sept. 23, 1958

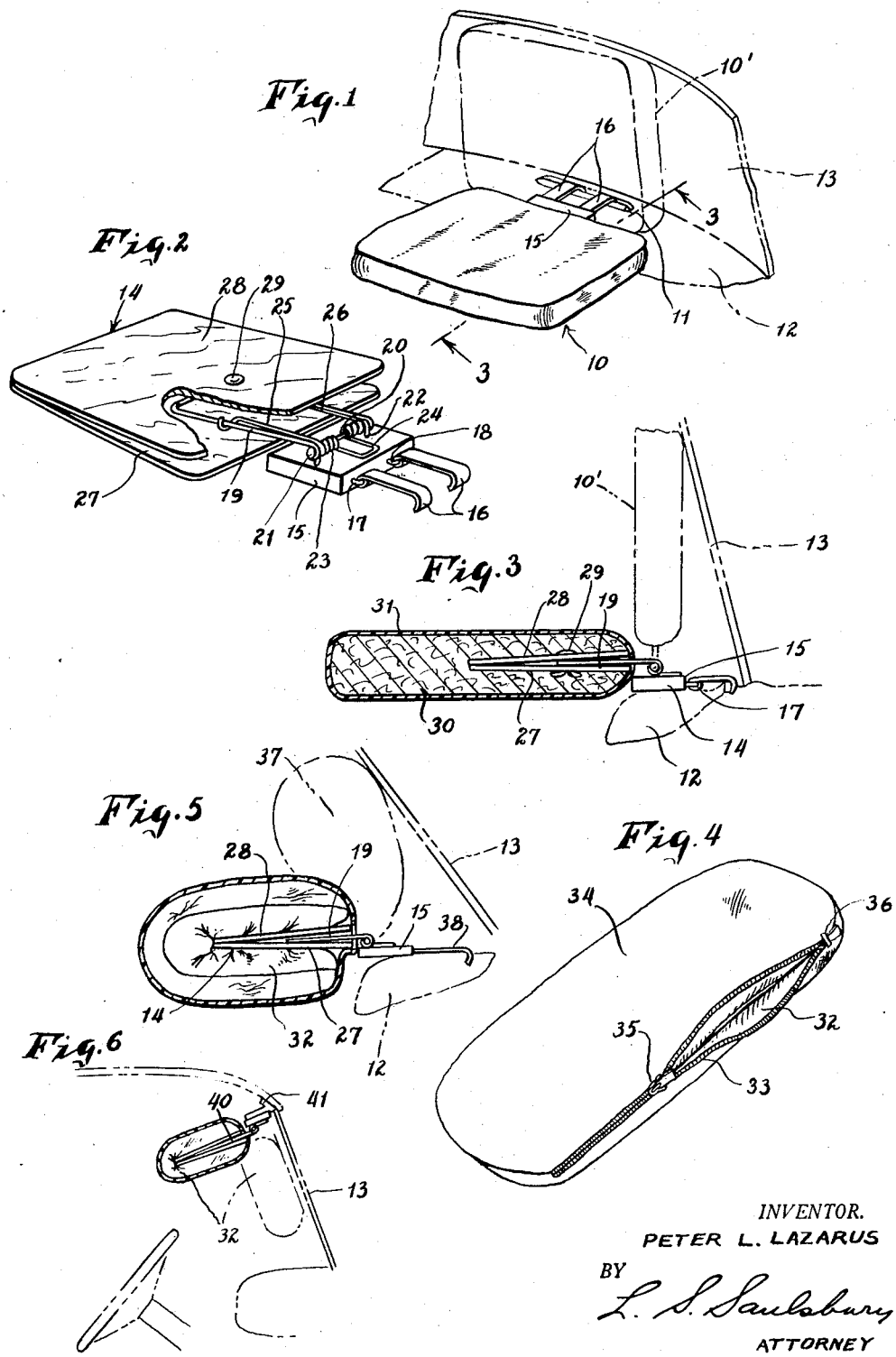

2,853,339

AUTOMATIC WINDSHIELD CRASH PAD FOR MOTOR VEHICLES

Peter L. Lazarus, New York, N. Y.

Application December 7, 1955, Serial No. 551,484

2 Claims. (Cl. 296—84)

This invention relates to an automatic crash pad for motor vehicles.

It is the principal object of the present invention to provide a crash pad for motor vehicles which will be automatically and instantly interposed between the occupant of the vehicle sitting on the front seat and the windshield at the time of an impending crash whereby the occupant will be saved from serious injury, cuts and bruises, that may result from being thrown directly into and through the windshield and yet lie normally in a position so as not to interfere with the vision of the occupant through the windshield during the normal travel of the vehicle over the road.

It is another object of the invention to provide a motor vehicle crash pad that can be easily fixed or attached to the dashboard of the vehicle so as to overlie the top and the front thereof and be supported in a floating manner by a spring biased member and normally held in a horizontal position under its own weight and adapted upon the vehicle approaching an inertia stop to be pivoted upwardly against the windshield free of its weight and under the action of a spring ahead of the thrust of the occupant so as to provide a barrier against which the occupant will be thrust to save him from serious harm.

It is still another object of the invention to provide an automatic crash pad that is formed of an inexpensively constructed spring lift device on which there can be readily and releasably assembled a separable sponge rubber cushion or a pillow arrangement doubled upon itself and extended over the spring lift device and a smooth covering extended about the cushion or pillow and removable therewith from the spring lift device.

Other objects of the invention are to provide an automatic crash pad for motor vehicles having the above objects in mind which is of simple construction, inexpensive to manufacture, has a minimum number of parts, easy to assemble and install upon the automobile, sold as an attachment, of pleasing appearance, light in weight, compact, durable, easy to maintain and automatic in operation, effective in use and efficient in operation.

For a better understanding of the invention, reference may be had to the following detailed description taken in connection with the accompanying drawing, in which:

Figure 1 is a perspective view of an automatic crash pad constructed according to one form of the invention and mounted to overlie the dashboard of the vehicle above the glove compartment yet sufficiently removed therefrom so as not to interfere with the access thereto with illustration made to show the vertical position to which the crash pad is extended when the crash becomes imminent, Fig. 2 is an enlarged perspective and fragmentary view of the spring lift device for the crash pad separated from thte cushioning material and its cover, Fig. 3 is a longitudinal sectional view of the crash pad as viewed on line 3—3 of Fig. 1, Fig. 4 is a perspective view of an elongated crash pad with the spring lift device separated therefrom and constructed from a folded over pillow with a slide fastened covering to hold the same upon the pillow and according to the modified form of the invention, Fig. 5 is a vertical sectional view through the pillow, Fig. 6 is a vertical sectional view of the crash pad as shown in Figs. 4 and 5 mounted on the top of the vehicle above the steering wheel to protect the driver at a high elevation but inclined downwardly slightly to be engaged by the head of the driver upon an impending crash and carried to the windshield as illustrated to protect his head therefrom.

Referring now particularly to Figs. 1, 2 and 3, 10 represents generally an automatic crash pad constructed according to one form of the invention. This crash pad is adapted to be releasably attached to a slot or defrosting opening 11 in a dashboard structure 12 of the vehicle in front of the windshield 13 thereof and as the vehicle comes to a sudden stop this crash pad 10 will automatically be elevated and thrust forward ahead of the occupant of the vehicle to a dotted line position 10' over the windshield 13 and be interposed between him and the windshield to absorb the impact of the occupant as he may be flung into the windshield and prevent him from being cut by glass.

The crash pad 10 has an inner spring lift device 14 that comprises a base 15 of wood or other suitable material to which a pair of laterally-spaced free hooks 16 are pivotally connected by staples 17 and 18 which are adapted to engage an elongated slot or defrosting opening 11 adjacent to the base of the windshield and in the dashboard structure of the passage of heated air to defrost the windshield.

A long U-shaped member 19 is pivotally connected to the top of the base 15 by a hinge pin 20 that is journalled between two upstanding laterally-spaced staples 21 and 22 and is biased to pivot upwardly by a double coil spring 23 surrounding the hinge pin 20. This coil spring 23 has an extension 24 that reacts against the top surface of the base 15 and two hook arms 25 and 26 that engages the sides of the U-shaped member 19 as shown in Fig. 2 so as to normally cause the U-shaped member to be biased and forced upwardly. This U-shaped member 19 extends between two square-shaped boards 27 and 28 which are connected to each other by a staple 29 that goes through the U-shaped member intermediate the sides thereof.

These boards 27 and 28 extend into a sponge rubber cushion 30 separable along one edge to receive the same and which has sufficient weight to overcome the spring 23 and normally remain in the position shown in Fig. 1. The cushion is made of sponge rubber and is weighted so that under normal travel of the motor vehicle, it remains in the extended horizontal position. The cushioning material has a covering 31 that may be of an attractive color and correspond to the interior decoration of the vehicle.

As the motor vehicle is slowed, as by the application of the brakes or by a sudden reduction of speed, the inertia of the vehicle will quickly carry the crash pad to the elevated or vertical position 10' shown in Fig. 1 arriving ahead of the occupant and will provide a barrier or pad against which the occupant can be thrown and kept from going through the windshield. The cushion 30 is separable along one edge to receive the boards 27 and 28 of the spring lift device 14 shown in Fig. 2.

In Figs. 4 and 5, there is shown a slightly differently constructed cushion for use with the same spring lift device 14. A pillow-like cushion 32 formed of any suitable material is folded over the boards 27 and 28 so as to extend along the underside of the board 27 and over the top side of the board 28 through a center separation 33 of a cover sheet 34 that is closed at the opposite sides thereof by slide fastener devices 35 and 36. This cushion is elongated in width but is short in length and overhangs the dashboard structure under its weight above the glove compartment door. The cushion extends throughout a sufficient width so that the windshield is substantially covered as the cushion is elevated to a position shown at 37 with the aid of the spring lift when the force of gravity has been overcome by the sudden slowing down or crash of the vehicle. Hooks 38, only one being shown, are longer than the hooks 16 and are similarly adapted to enter the defrosting slot on top of the dash board adjacent to the windshield. These hooks 38 may, as shown, be rigidly connected to base 15 of the spring lift device. It will be understood that any suitable cushioning material and covering can be used and that it is sufficient that this material be adapted to break the force of the occupant without harm and to have sufficient weight so as to be retained in its lowered position against the action of the spring lift device and so as not to interfere normally with the view of the occupant through the windshield.

According to Fig. 6 there is shown the cushion device fixed to the top of the vehicle as indicated at 40 and 41. This cushion device is the same as the device shown in Figs. 4 and 5 and the spring lift device is adapted to normally hold an elongated cushion 32, the form shown in Fig. 4, in the elevated position and upon being inclined downwardly slightly, the driver's head may engage the same so as to bring it downwardly to the position shown in Fig. 2 over windshield 13. This cushion would move downwardly as the arm or head tended to engage with it so as to present a large cushioning area against which the driver of the vehicle would be thrown and thereby prevent his engagement with the windshield. When the impact is over the spring of the device will elevate it and normally sustain it in its out of the way position in the top of the vehicle.

It should now be apparent that there has been provided a crash pad for use in motor vehicles which will be interposed automatically due to inertia resulting to the sudden slowing down of the vehicle between the occupant and the windshield as the occupant is thrust forward toward the windshield. It will be further apparent that this crash pad can be made inexpensively, easily assembled and that it will not interfere with the vision of the occupant of the automobile through the windshield under ordinary driving conditions.

While various changes may be made in the detail construction, it shall be understood that such changes shall be within the spirit and scope of the present invention as defined by the appended claims.

What is claimed is:

1. An automaitc crash pad for use with motor vehicles comprising a spring lift device connected to the vehicle in front of the windshield and including a pivotal connection, a spring for biasing the spring lift device upwardly and forwardly about the pivotal connection, a cushion secured to the spring lift device and having sufficient weight to overcome the spring lift device and hold the cushion suspended and extended horizontally against the action of the spring, and said spring lift device having sufficient force upon the cushion being impelled forwardly under inertia resulting from the cessation of movement of the vehicle so that the cushion will be automatically elevated to an upright position adjacent the windshield and interposed between the occupant and the windshield, said cushion having an opening extending along one edge thereof, said spring lift device having rigid board-like members secured thereto, said board-like members being removably extended into the opening of the cushion and extended from the edge thereof.

2. An automatic crash pad for use with motor vehicles comprising a spring lift device connected to the vehicle in front of the windshield and including a pivotal connection, a spring for biasing the spring lift device upwardly and forwardly about the pivotal connection, a cushion secured to the spring lift device and having sufficient weight to overcome the spring lift device and hold the cushion suspended and extended horizontally against the action of the spring, and said spring lift device having sufficient force upon the cushion being impelled forwardly under inertia resulting from the cessation of movement of the vehicle so that the cushion will be automatically elevated to an upright position adjacent the windshield and interposed between the occupant and the windshield, said cushion having an opening extending along one edge thereof, said spring lift device having rigid board-like members secured thereto, said board-like members being removably extended into the opening of the cushion and extended from the edge thereof, and said cushion being in the form of a pillow elongated in width and folded about said boards, a covering for said pillow cushion to hold the latter upon said boards and being separable to open along one side intermediate the length thereof to receive said boards, and slide fasteners at the opposite sides of the separable opening thereof for releasably securing the covering throughout the remainder of its width.

References Cited in the file of this patent

UNITED STATES PATENTS

| 2,187,027 | Harvey | Jan. 16, 1940 |
| 2,626,163 | Scantlebury | Jan. 20, 1953 |
| 2,742,662 | Lyons | Apr. 24, 1956 |

FOREIGN PATENTS

| 1,031,160 | France | Mar. 18, 1953 |
| 897,053 | Germany | Nov. 16, 1953 |